United States Patent Office 3,277,448
Patented Oct. 4, 1966

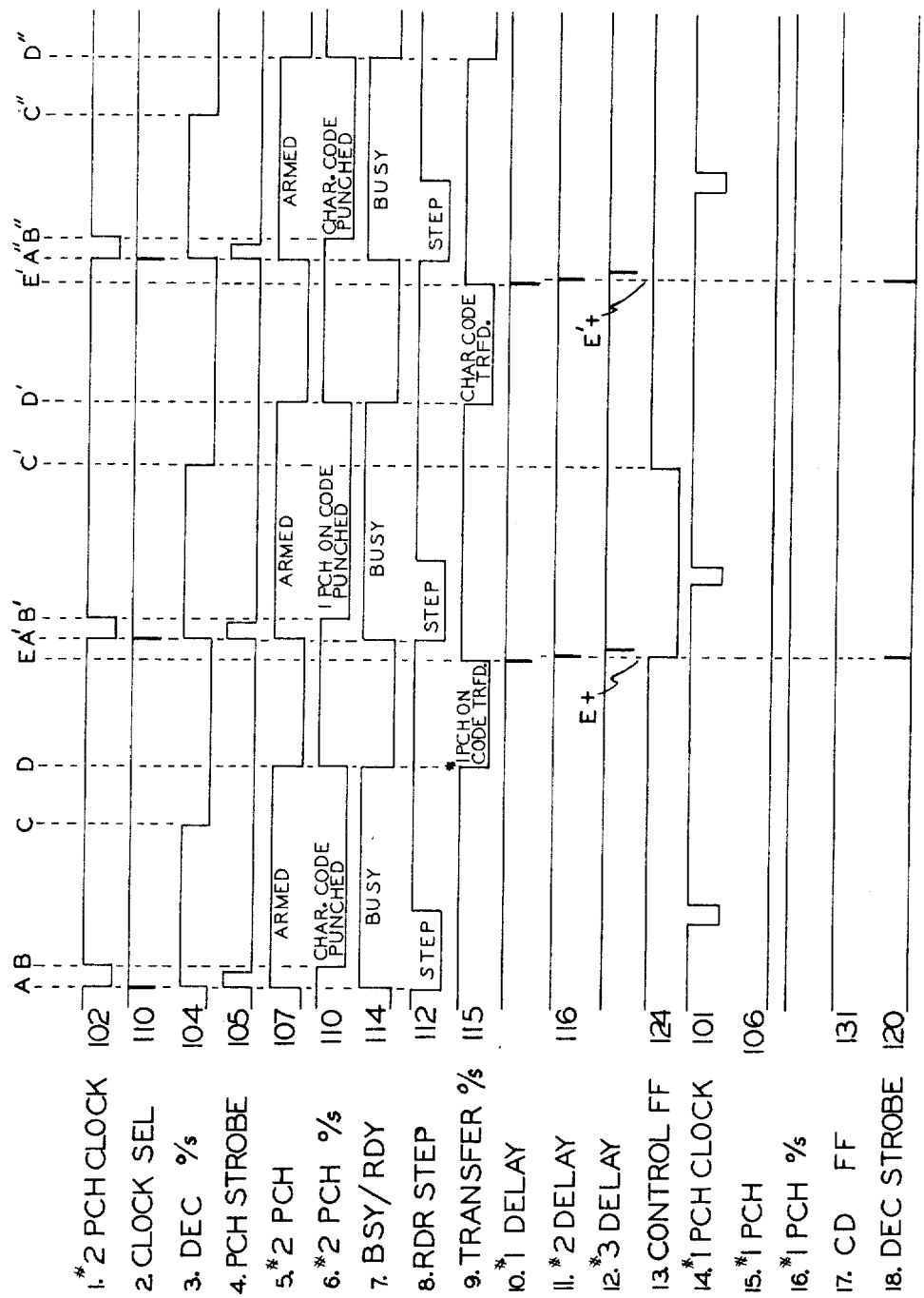

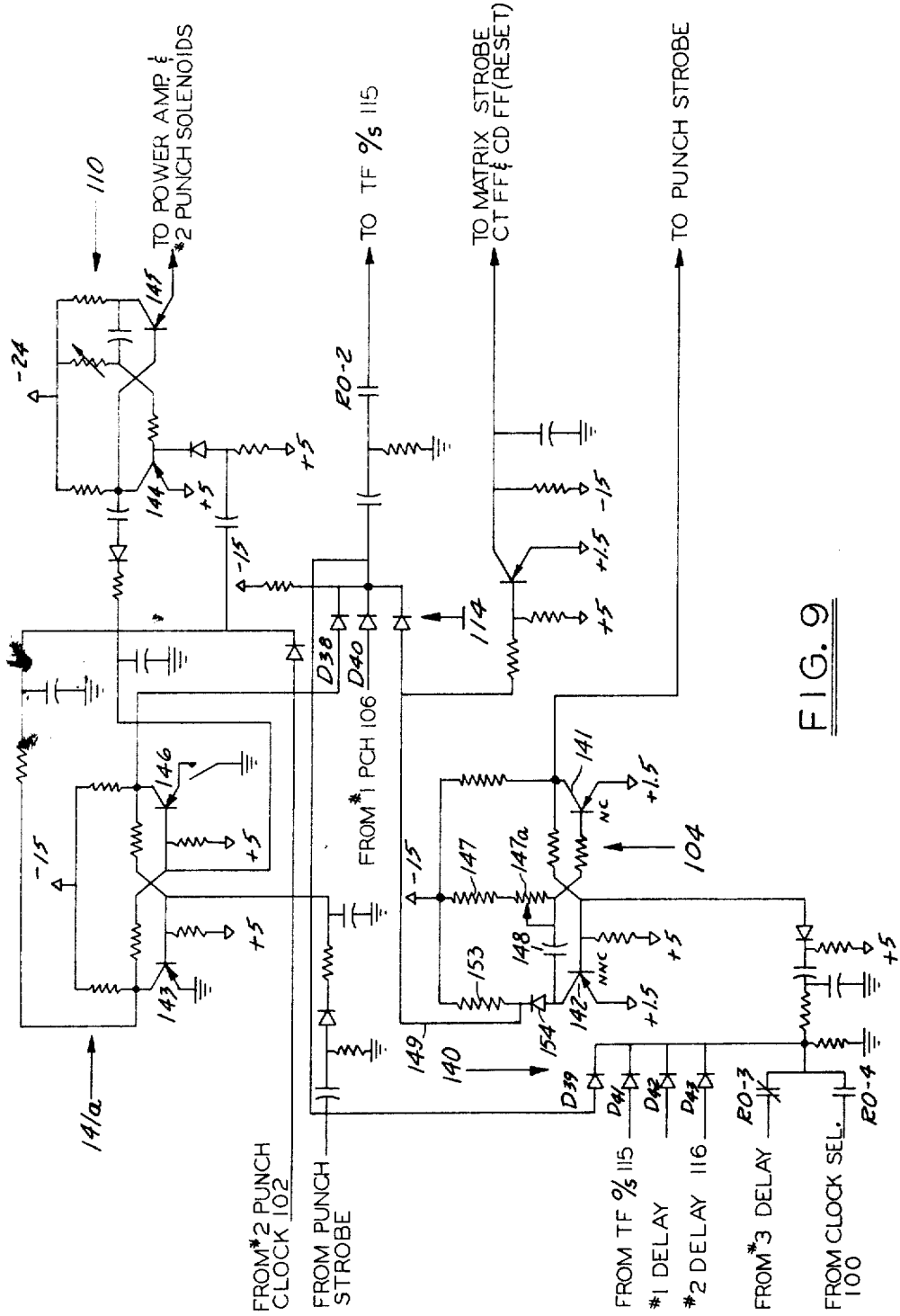

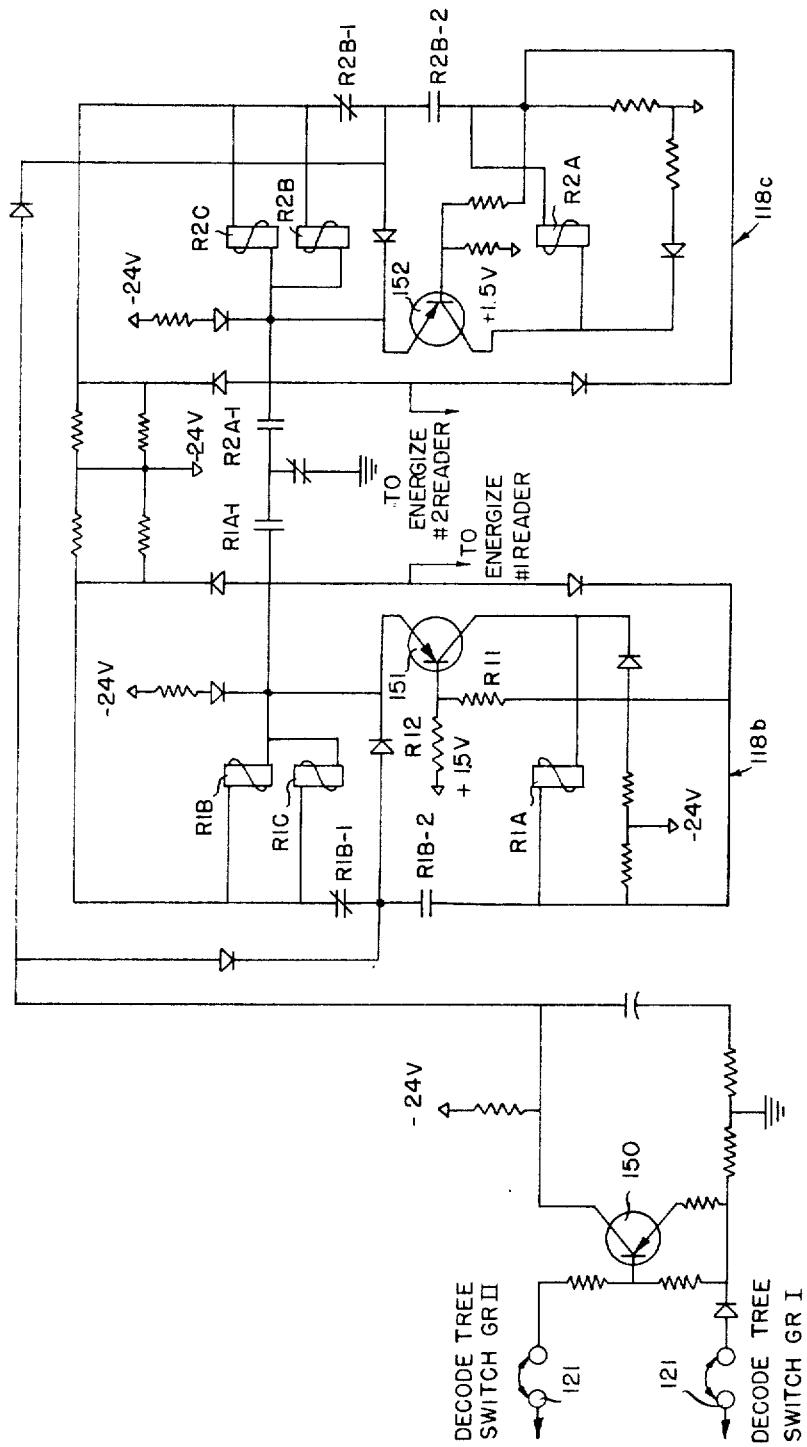

3,277,448
DATA PROCESSING MECHANISMS
Ronald N. Borrelli, San Leandro, Harold T. Madden, Pleasant Hill, and Stanley R. Olson, Oakland, Calif., assignors to SCM Corporation, a corporation of New York
Filed Dec. 6, 1961, Ser. No. 157,425
27 Claims. (Cl. 340—172.5)

This invention relates to data processing systems wherein information on a coded record medium is used to control operation of the system to produce a printed record and/or other coded record media; more particularly it relates to means for selectively controlling the information reproduced in the coded record media either automatically in response to coded commands on the medium or manually in response to operator action at a control keyboard.

A typical data-processing system of the kind referred to above will comprise (choosing for example, perforated paper tape or edge-punched cards as the record medium, both referred to hereinafter by the term "paper tape"): one or more paper tape readers, one or more paper tape punches, a typewriter for manual input and for printed output, and a set of command keys together with a control unit. With such a system, different groups of data stored in one or more paper tapes can be selectively processed to print a record and punch one or more by-product tapes. A common business practice, particularly at order stations, is to have one reader scan a first tape, or "program" tape, containing such information and commands as may be required to control sequencing of input of information derived either automatically from a second tape scanned by a second reader, or manually by the operator from the keyboard of the input typewriter. By means of control codes on the tapes of these readers, selected groups of data may be printed, and/or punched in a third paper tape, and/or punched in a fourth paper tape, etc., in any and all combinations.

As example of the diversity of the data captured in the various media, the printed record created at such a station may contain information pertinent only to an invoice, the third paper tape may contain only inventory control information, and the fourth paper tape may contain only sales information for use by management.

In the prior art, U.S. Patents Nos. 2,700,446 and 2,905,298 for example, automatic and also operator control of both the printing machine (i.e. typewriter) and the system depends upon the operation of a corresponding command key, or lever, on the writing machine. When, therefore, a "Non-Print" code on the tape (which disables the printing machine and enables all subsequent codes to be punched by any selected punch) precedes a command code, the latter code is punched but is ineffective to operate a corresponding command key on the printing machine. This results in complication when the system is in "Non-Print" condition, because if a command code from a tape reader is to be obeyed, "Non-Print" must first be turned off and then after the command code has been obeyed, it must be turned on again to restore the machine to the original condition. The interposed codes increase the time required to complete a given task. Because the controls are effected through operations of key levers, the speed of response to a series of such control codes is linked to the speed of the typewriter, which is generally slower (10–15 characters/sec.) than the speed of the other components of the system (about 30 characters/sec.).

The data processing system according to one aspect of the present invention provides greater flexibility and simplification of progarmming; and more efficient operation by rendering the machine directly responsive to command codes independently of the "Non-Print," or other subsidiary conditions of the machine. This is achieved by circuitry responsive to manual depression of a command key, hereinafter referred to as the "Code Control" key or responsive to a reader sensing a code corresponding to this key. Thus, the automatic mode of operation is augmented by providing a variation, hereinafter referred to as "Code Control On" mode, wherein command codes which are sensed by a reader are obeyed but not punched, regardless of whether the typewriter is in print or non-print condition, i.e. whether information codes result in printing or non-printing of characters. In the inverse mode, "Code Control Off," it is generally desired that command codes not be obeyed but that they be punched, again regardless of whether information codes result in printing or non-printing of characters.

In this latter mode there is one exception in that the command "Code Control On" must be both punched and obeyed when in "Code Control Off" condition, otherwise the system could never change automatically from "Code Control Off" to "Code Control On" condition.

The present data processing system also provides means whereby the system can be made compatible, if desired, with systems functioning in the fashion of the prior art though this will not achieve the greater flexibility afforded by separating command response function and "Non-Print" function. For compatability, means must be provided such that when "Code Control Off" mode has been initiated manually and the system is also in the "Non-Print" (or non-obey) condition, the sensing of a "Stop" code by the reader will turn "Non-Print" off, turn "Code Control" on, stop the reader, and also punch the "Stop" code. This requirement stems from the need to stop the reader for manual entry of data even when in "Non-Print" condition, and the system automatically must be put in "Code Control On" mode because this mode corresponds to the "Print" condition in prior art systems.

Means must also be provided for compatibility purposes, such that when Code Control has been turned "off" automatically by the tape reader, the sensing of a "Non-Print Off" or obey code thereafter will turn "Non-Print" off and "Code Control" on. This requirement stems from a similar need to correlate "Code Control On" mode with "Print" condition in prior art systems.

It is therefore a main object of this invention to provide an improved data processing machine of the type having one or more input sources including manual entry of data and command information and one or more coded record media outputs as well as a printed record output.

Although the invention is disclosed as being embodied in a data processing machine including synchronous punches it should be understood that the type of punches used is but a matter of choice and that many aspects of the invention may be practised with a data processing machine using asynchronous punches. When synchronous punches are used, one requirement must be met, to wit, the code to be punched must stand in an information register (which sets up the coded circuits for the punch) at the time the punch cycle is initiated. This requirement arises from the fact that it is impossible to count upon a fixed time interval for transfer of coded information into the register after a clock signal has been received by the punch.

Since the speed of the system components may differ considerably (3:1 say) and the above-mentioned punches are synchronous units with independent clocks while other components do not have independent clocks, means for providing the optimum clock rate are needed. The other components comprise, for example, one or more paper tape readers capable of operating at the punch rate, but not having a built-in clock; and a typewriter modified for input/output and having an operating rate lower than that of the punches (an encoder and decoder may be part of the input/output unit).

Another object is to provide a data processing system having a data processing unit for transmitting data to recording devices, each of which recording devices has a discrete speed of operation, and such transmission being at the optimum speed dependent on which recording device is enabled to receive data.

Another object is to initiate the transmission of data from an output unit to a plurality of synchronously operating data recording devices, which may be out of phase with each other, immediately upon the completion of recording the last previous data by all the recording devices.

Another object is to provide control circuits facilitating automatic as well as manual selection of both the source of the information and its destination, without regard to whether the data is currently being printed. In accordance with this feature of the present invention, codes detected by the reader may be used to turn off the #1 punch and turn on the #2 punch, or vice versa; a first control mode and a second control mode are provided and operable by the reader to enable the punches while disabling the typewriter and to enable the typewriter while disabling the punches; and a "reader skip" function is provided whereby the reader, upon detecting a command datum, will scan without reading out further recorded information until another command datum is detected in the tape. Such novel features accordingly provide improved flexibility of programming, and greater efficiency by the elimination of unnecessary operations required in the prior art systems, and simplify the manual control exercised by the operator.

It is another object of this invention to provide additional circuits permitting the improved machine to be compatible with prior art machines, that is, permitting a machine of either type to be operated automatically with media prepared on a machine of the other type.

These and other objects and advantages of the invention will become more fully apparent from the claims, and the following detailed description when read in connection with the appended drawings in which:

FIGURES 2, 2A and 2B are diagrams illustrating the timing of the various components in the "Code Control On" and "Code Control Off" modes of operation;

FIGURE 9 is a circuit diagram for electronic interlocks on the cycle initiating means; and FIGURE 10 is a circuit diagram of the reader logic circuits for transferring the control of the system from one reader to the other reader.

Figure 1:
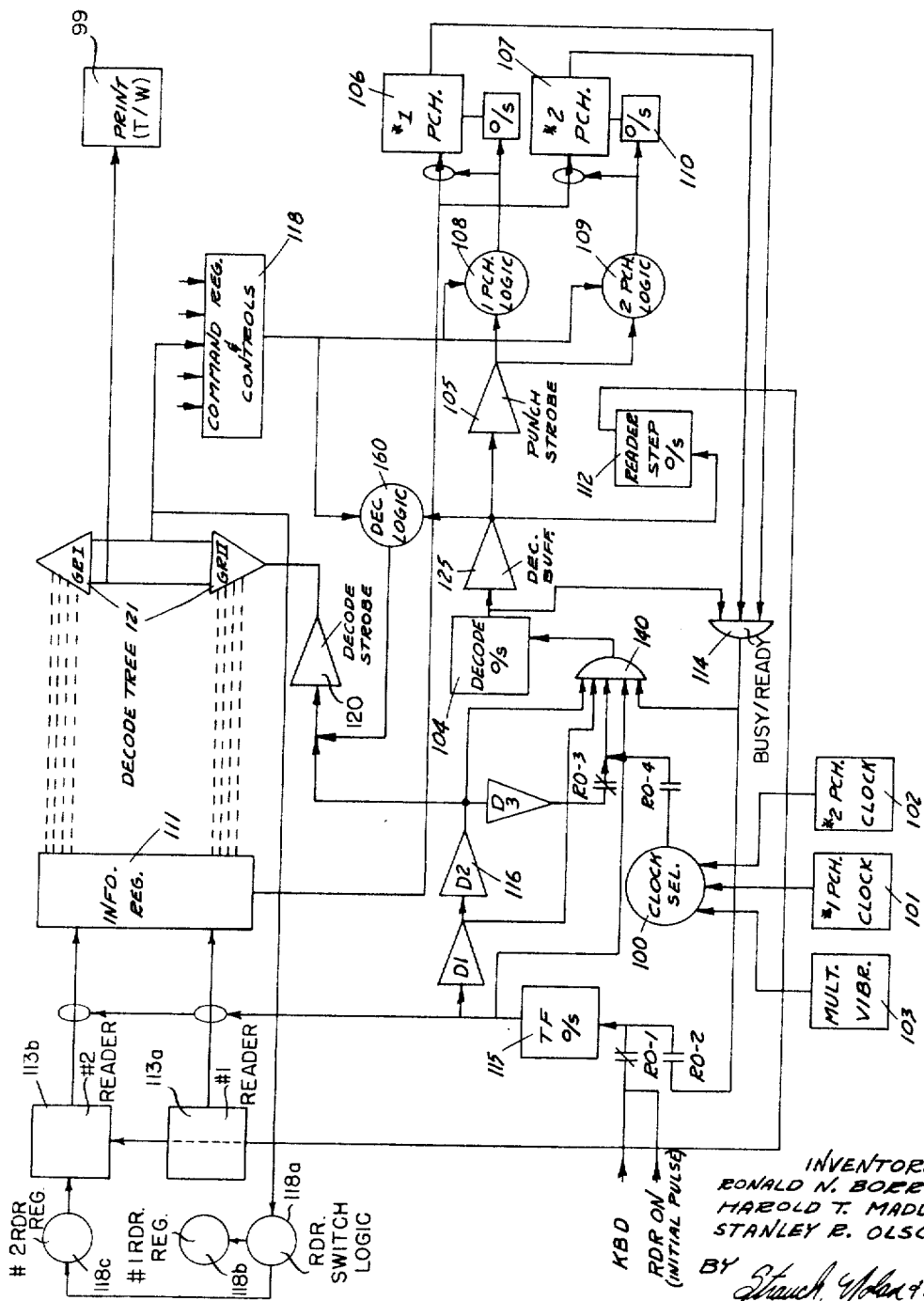
FIGURE 1 is a block diagram of the system.

Referring now to the drawings, the system of the present invention may embody one or two perforated record (i.e. card and/or tape) readers 113a and 113b that may be of the type disclosed in the copending application Serial No. 118,284, filed June 20, 1961 by Herbert Stickel et al., and assigned to the assignee of the present invention; a printer type recording unit, such as an electric typewriter having suitable coding and decoding means; and a pair of paper punch type recording units 106 and 107 such as are described in the copending application Serial No. 157,540, filed on even date herewith by Clayton H. Clark et al., now Patent No. 3,205,305 and assigned to the assignee of the present invention, for producing records that may be used as input records for other data processing equipment. This type of system is commercially available and may be of the general type shown in U.S. Patents Nos. 2,859,817 and 2,980,225. The present invention involves the control of the operation of the system components, particularly where two punches and/or two readers are incorporated in the system, and the several drawings and subsequent description are accordingly limited to the control circuits which perform the functions outlined above.

The present invention in large part relates to that mode of operation wherein a punched tape is being read by one or both readers 113 and the information transferred from information register 111 to decode tree 121 to be printed on typewriter 99 and applied to command register and control circuit 118 to be punched by one or both of punches 106 and 107.

Figure 5:
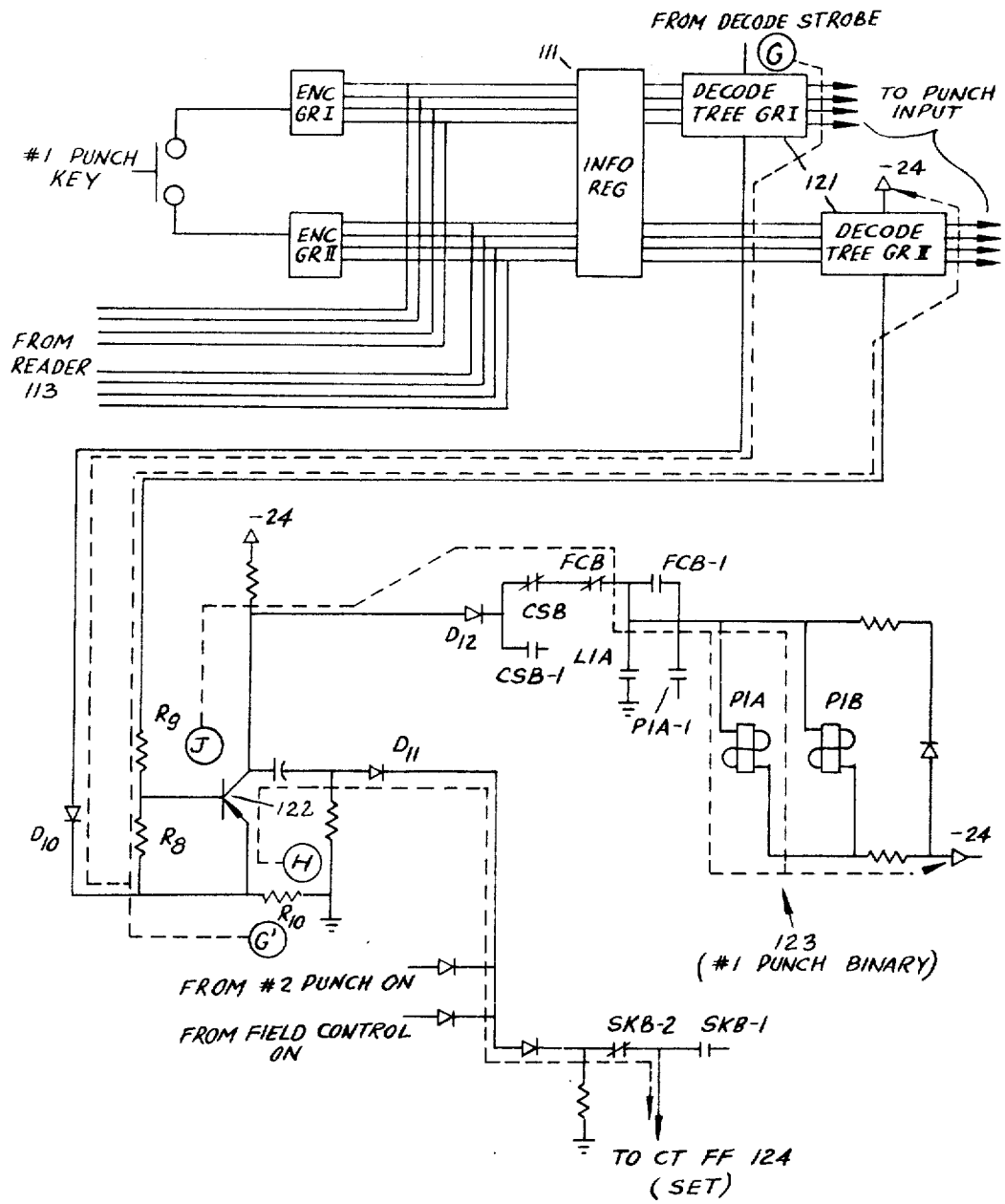

FIGURE 1 shows the general means for input to and output from the system. The input from any key of typewriter 99 is obtained (in fashion similar to that for input of commands from keys in a control keyboard) by closure of a switch corresponding to that key, to generate a signal which may pass through a diode matrix of any suitable type, many of which are well-known in the art for encoding purposes. In FIGURE 5, where the means for encoding and decoding a command are presented, this matrix is shown as two blocks labeled Enc. Gr. I and Enc. Gr. II with input from a switch operated by a particular key. The output of the encoder is used for operating the relays of information register 111 to set up the two decode trees 121. The output of the reader 113 is paralleled with the Encoder Output, as shown in FIGURE 5.

The closure of the switch for any key provides, in addition, a pulse which triggers the Transfer One-Shot 115 through a normally-closed contact RO-1 via the input marked KBD in FIGURE 1. The output of the Transfer One-Shot 115 actually provides the timing for pulling in the relays of the information register 111 according to the information in the encoder or the reader 113.

With respect to output, setting up the decode tree establishes a particular path and the decode strobe pulse passing through this path operates a solenoid to trigger a typebar or function control linkage on the typewriter or pulls in the relays of the appropriate binary in command register 118, if the coded information is a command to the system. Thus, circuits for input and output to the typewriter are similar to those shown in FIGURE 5 for input and output to command register 118.

Figure 8:
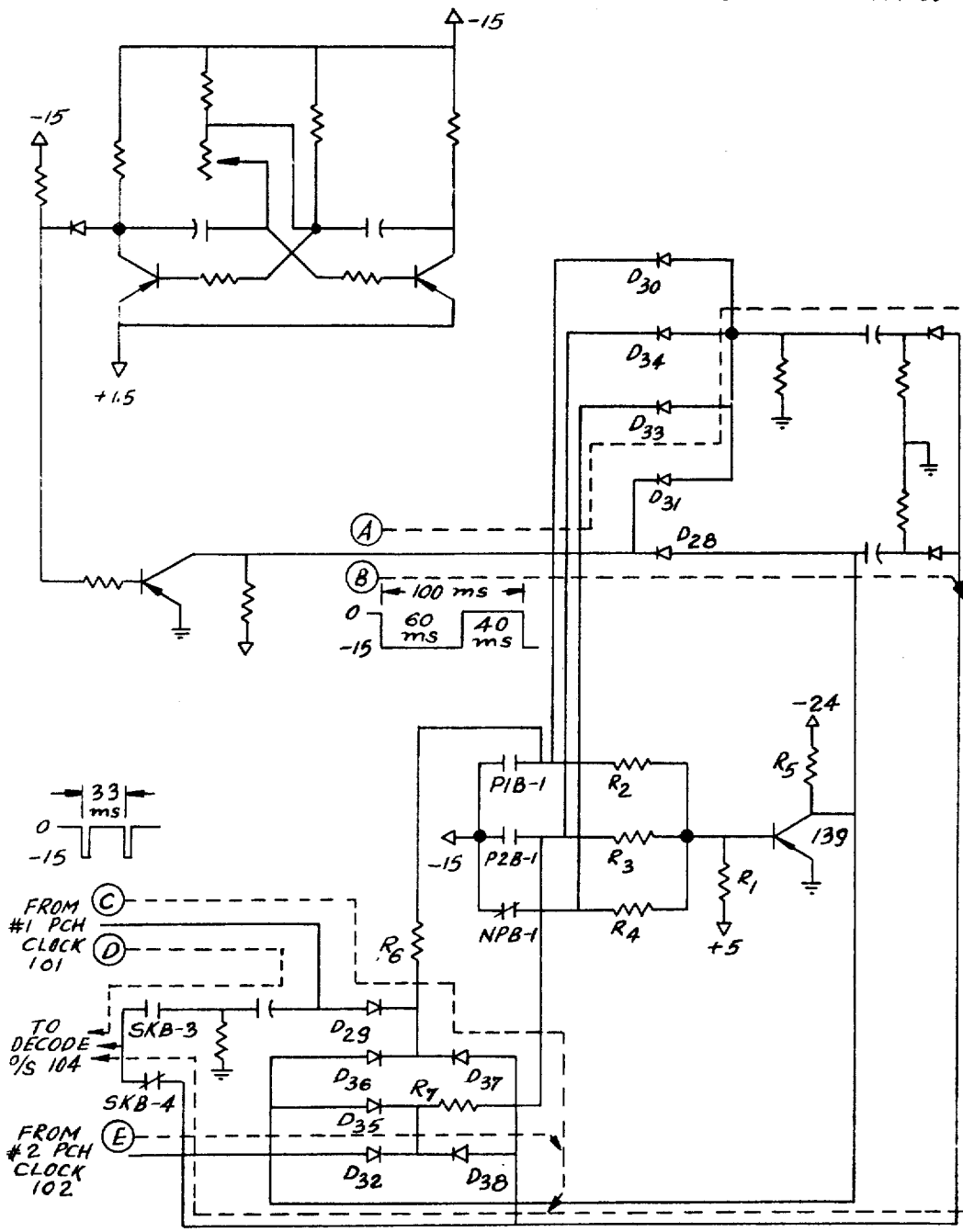
FIGURE 8 is a circuit diagram of the control mechanism which determines the alternative speed of operation of various components of the data processing mechanism.

Each punch 106 and 107 contains a clock 101 and 102, and a free running multi-vibrator 103 is also provided which controls the system at its lowest speed, i.e. that of the typewriter which is about 10 characters per second (100 ms. pulse period). The clock for this mode of operation is provided, as shown in FIGURE 8, by the free-running multi-vibrator 103 having the prescribed frequency. On the other hand, when the typewriter is not enabled for printing, the system will operate at the faster speed of the other components so the 30 characters per second (33 ms. pulse period) clock signal from either punch is used. There are four basic modes of operation, however, and it will be seen that speeds intermediate to the two above-mentioned extremes are possible when both punches are selected through the circuit including clock selector 100.

A "reader on" (RO) relay associated with readers 113a and 113b has a coil (not shown) and normally closed contacts RO-1, RO-3 associated with normally open contacts RO-2, RO-4. When a reader is turned on, contacts RO-1, RO-3 open and contacts RO-2, RO-4 close so that upon receiving a signal from a clock selector 100 (selected from either of the two punches 101, 102 or a free-running multi-vibrator 103, depending upon conditions described hereinafter) a one-shot multi-vibrator 104, labeled Decode One-Shot, is energized through "and" gate 140 and triggers a punch strobe 105 through decode buffer 125. The latter, in turn, arms punch 106 or 107 depending upon the condition of circuitry generally indicated as #1 punch logic 108 and #2 punch logic 109 in FIGURE 1 which receives also the information from command register and controls circuit 118.

Figure 2:
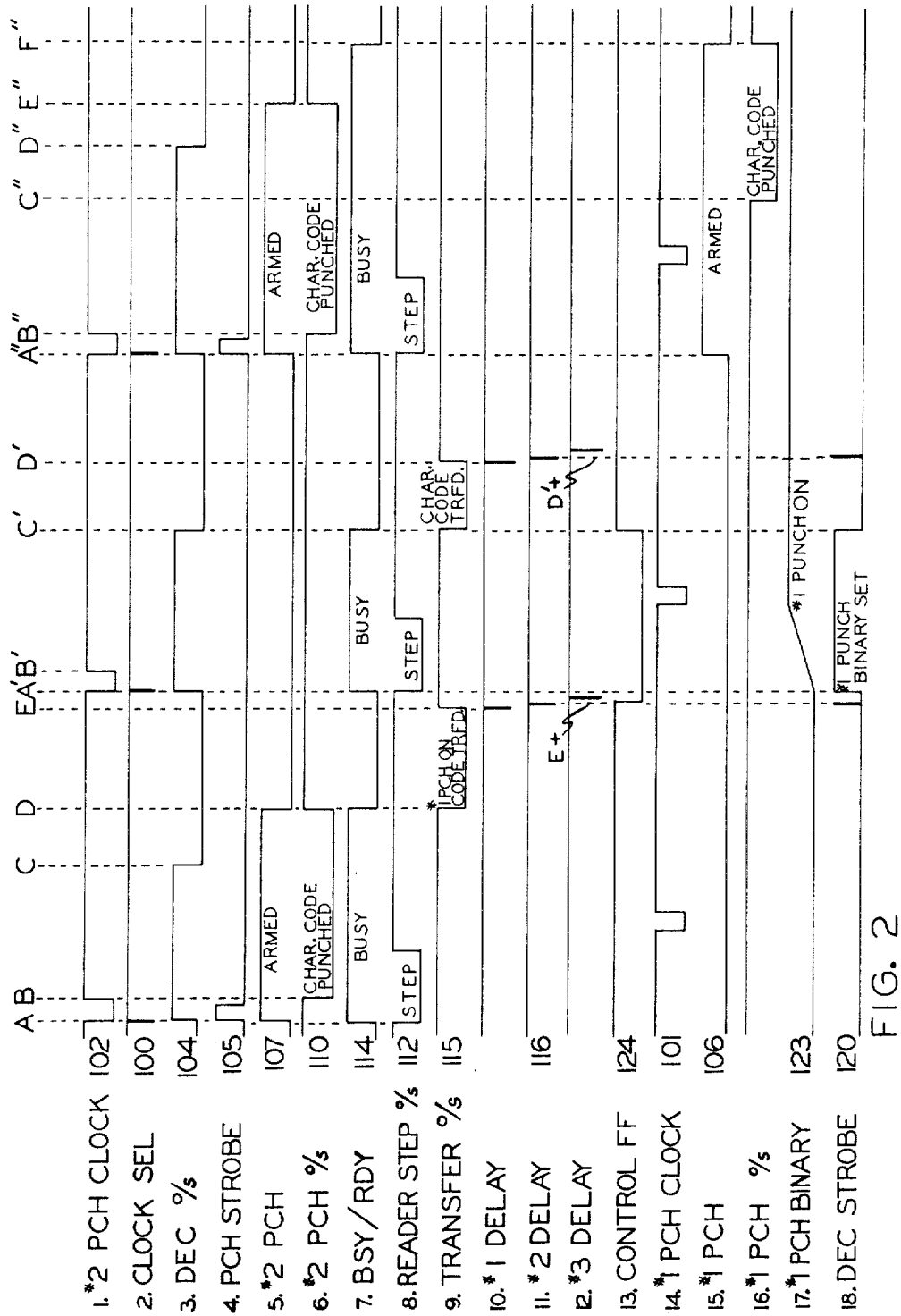
Figure 2B:
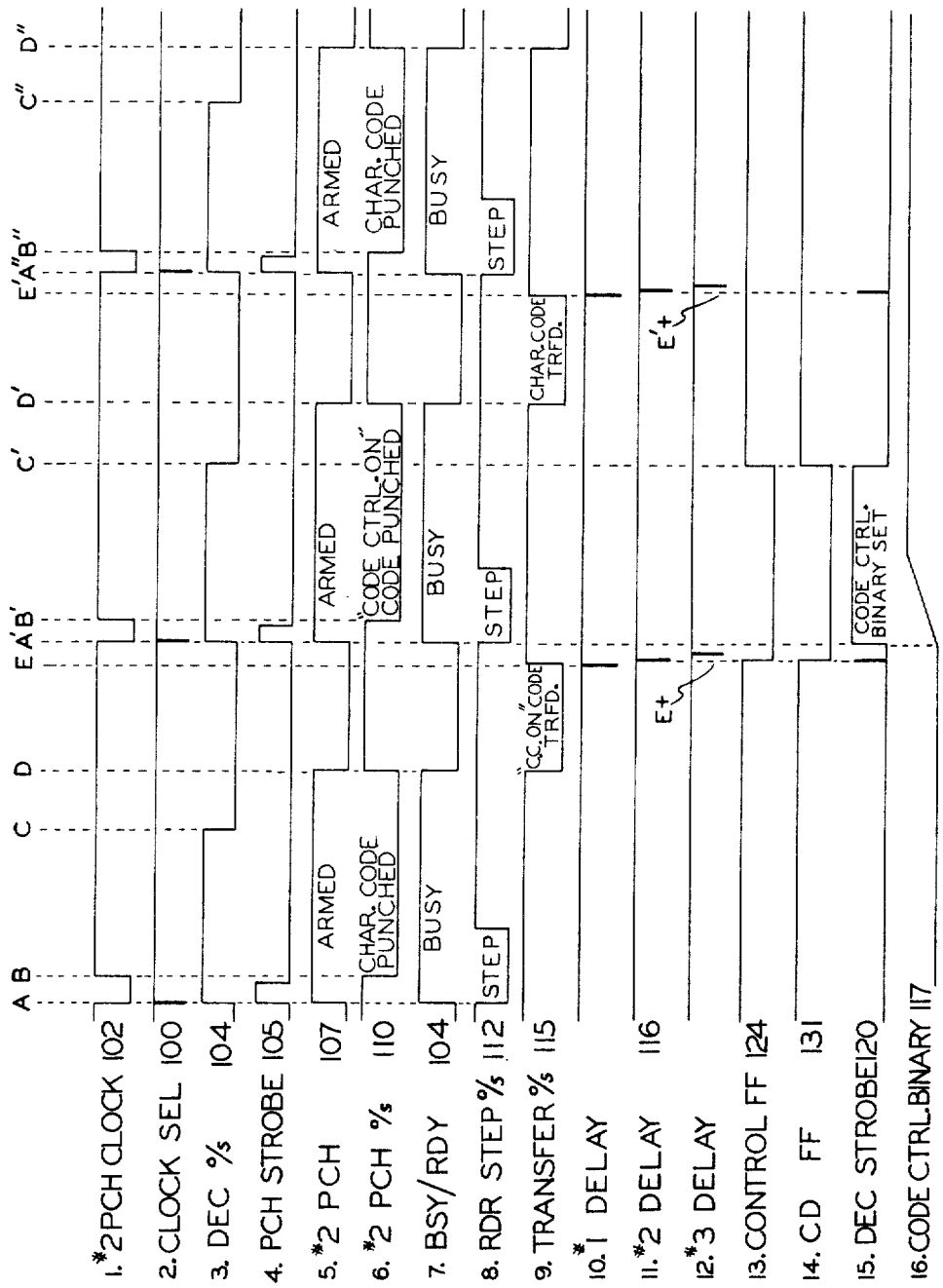

With reference to FIGURE 2, all of these events are shown as occurring at time A lines 1, 2, 3 and 4 in FIGURE 2. FIGURES 2, 2A and 2B each show a plurality of cycles of operation, which cycles are indicated by A, A', A" etc.

With the #2 punch 107 armed, for example, the trailing edge of the selected punch clock signal from #2 punch clock 102 (line 1) triggers, at time B, a One-Shot circuit 110 (see also FIGURE 1 and line 6 of FIGURE 2) associated with that punch to effect the actual punching of the code already set-up in an information register 111 (FIGURE 1).

In FIGURE 2, three cycles A–E of operation are illustrated. At time A in FIGURE 2, the Decode O/S 104 (line 3) also triggers a Reader Step One-Shot 112 (line 8) to move the tape in the energized reader 113 (FIGURE 1) to the next position. The transfer of data from the next tape position to information register 111 is blocked. Arming of the #2 punch 107 (line 5) sends a "busy" signal through "and" gate 114 (line 7) which is the Busy/Ready gate. This prevents triggering one-shot multivibrator 115, the Transfer One-Shot, the output signal of which controls a transfer of data from the energized reader 113a or 113b into the information register 111. Only after completion of the cycles of all energized punches which might possibly have used the data previously in the information register 111, will Busy/Ready gate 114 permit Transfer One-Shot 115 to enter the next data into register 111.

It should be noted that if two punches are armed such as shown at lines 5 and 15 (FIGURE 2) in the third cycle of operation "A–E," the Busy/Ready gate 114 (line 7) is not turned off until both punch cycles are completed. Then, the change in the output of gate 114 (line 7) at time "D" triggers the Transfer One-Shot 115 (line 9) to strobe the reader 113 (FIGURE 1) and read the next code into the information register 111.

Reverting now again to the first cycle of operation A–E, the trailing edge of the Transfer One-Shot pulse (time E, line 9, in FIGURE 2), sends a short pulse through #1, #2 and #3 delays (lines 10, 11 and 12), the outputs of which are used for various purposes in the system. The pulse from #2 Delay 116 is the only one of interest herein and will be discussed in more detail later, but it will be identified at this time as a particular pulse used for detecting command codes.

The system is now ready for the next signal from clock selector 100 (line 2) at time A', which again coincides with the clock pulse from #2 Punch 107 (line 1) because this punch is the only output means turned on and the #2 punch clock 102 is synchronized with the operation of the punch.

As explained above, the punches 106 and 107, being synchronous, act upon information currently in the information register 111. This poses no problem except when a reader is first turned on, at which time there may be no information in the register 111. Means are provided to ensure that the proper code is always available in the information register 111. To this end, when the reader 113 is first turned on, a relay binary (not shown) is set and by means of the normally closed contacts RO–1 in FIGURE 1, establishes a path through which a pulse is sent from "RDR on" to trigger the TF O/S 115. This causes the code currently in the reader 113 to be shifted into the information register 111. When the above-mentioned reader binary is set, the same (or similar) contacts supply power to a relay such that contact RO–1 opens and RO–2 closes, breaking the above-described path, but only after the pulse is sent. At this time also, contact RO–3 opens and contact RO–4 closes, permitting the next pulse from the clock selector 100 to pass to the Decode O/S 104 to initiate a punch cycle, reader step, and code transfer cycle, etc. as described above.

*Clock Selector*

The four possible modes of operation and the clocks provided, together with an explanation of the manner in which these clocks are selected by the Clock Selector 100 are as follows:

*Reader Skip Mode* (Clock path D in FIGURE 8, pulse rate corresponds to 30 characters per second).

"Skip" is a mode in which the reader is operated but information on the tape is passed over until reaching the next data to be read and printed and/or punched.

Figure 3:
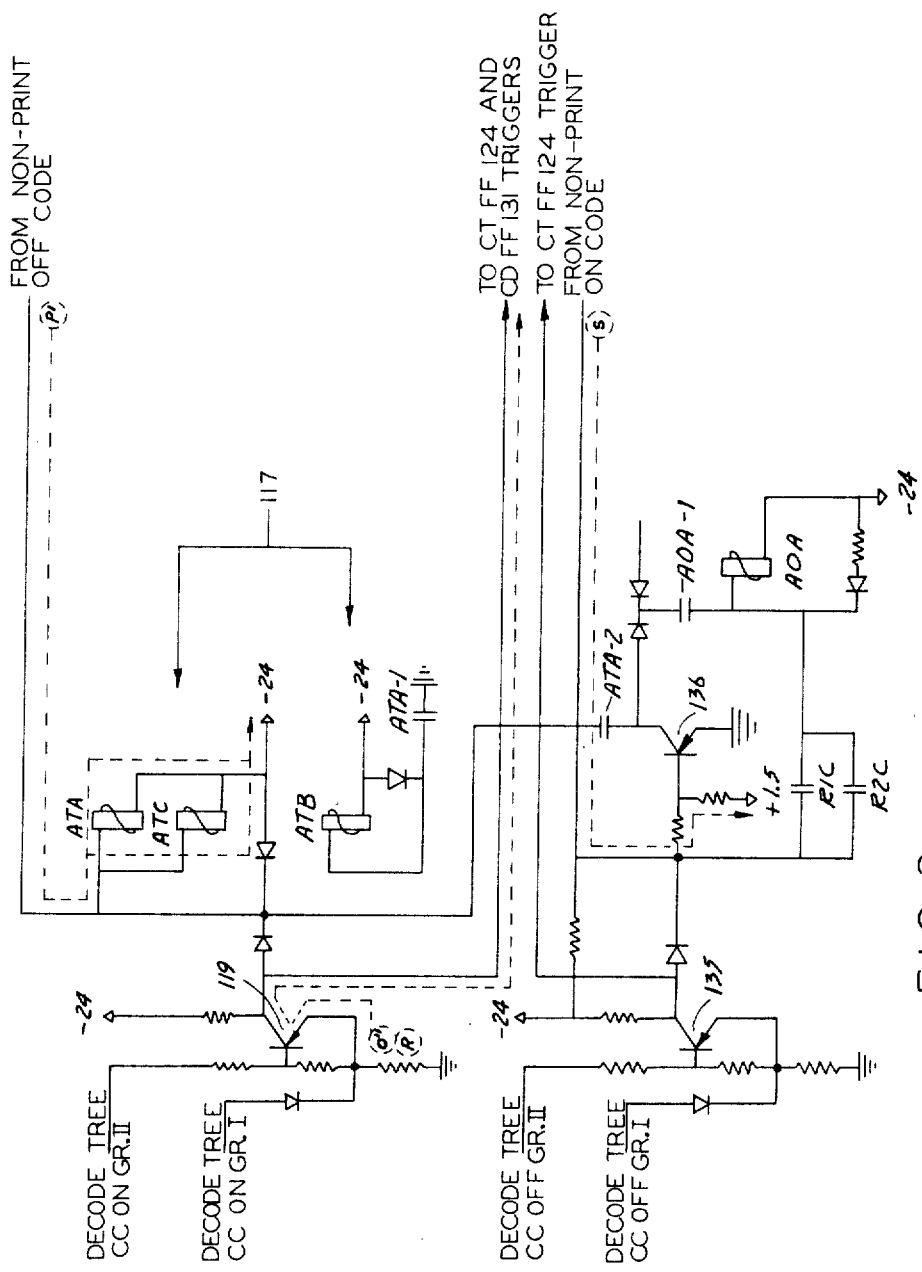
FIGURES 3, 4 and 5 are circuit diagrams of the memory and logic parts of the invention.

When in this mode of operation, which can be established by manual depression of a special key or by detection of a special code, a relay binary of the type shown for Code Control (FIGURE 3) is operated in fashion similar to that described in detail below. When the "Skip" relay pulls in, it closes its normally-open contact SKB–3, thereby providing a path (clock path D, FIGURE 8) for the clock from #1 punch which is available even when #1 Punch has not been selected. When the "Skip" relay is energized, it also opens its normally-closed contact SKB–4 which is part of the path to the Decode One-Shot 104 used for all other clocks. Opening this contact thus prevents passage of the latter clock pulses. Contacts on the relay provide a holding circuit through a transistor switch similar to that shown for Code Control (FIGURE 3). The strobing of a "Skip Off" code, transferred to the information register from the Reader 113 or by manual re-depression of the "Skip" key, results in the "Skip" relay being dropped out.

*Punch One Alone Selected* (Clock path C in FIGURE 8, pulse rate corresponds to 30 characters per second.)

In this mode of operation, information from the reader goes only to one punch, the typewriter being in disabled condition, i.e. non-print. Accordingly, in this mode, relay NPB (FIGURE 7) and (choosing the #1 Punch as the "on" punch) relay P1B (FIGURE 5) are actuated, the former relay being the means for disabling the typewriter. The Clock Selector transistor 139 (FIGURE 8) is "Off" because of positive voltage provided to its base by current from the +5 bias voltage to the −15 voltage through resistors $R_1$ and $R_2$ ($R_1$ being chosen much smaller than $R_2$) and the now closed contact P1B–1. When transistor 139 is "Off," the −24 voltage on its collector back-biases diode $D_{28}$, thereby blocking path B for the clock pulse from multi-vibrator 103.

Because of the closed contact P1B–1 on actuated relay P1B, −15 volts is provided through $R_6$ to forward-bias diode $D_{29}$ so the pulses from #1 Punch clock 101 are permitted to pass by the clock path C. This −15 voltage is also provided through diode $D_{30}$ to back-bias diode $D_{31}$, thereby preventing the multi-vibrator pulse from using clock path A.

With #1 Punch 106 alone selected, pulses from the #2 Punch clock 102 do not pass because diode $D_{32}$ is clamped by positive voltage supplied from the +5 volts on the base of transistor 139 through $R_1$, $R_3$ and $R_7$.

If #2 Punch 107 had been selected as the sole punch, clock path E would have been enabled in fashion similar to that described for #1 Punch 106, as is evident from FIGURE 8, and the same clock pulse rate would prevail.

*Both Punches Selected* (Typewriter still disabled)— (Clock path C or E alternatively, pulse rate averages about 22 characters per second.)

This mode of operation is similar to that described immediately above, except that the pulse from either punch clock can be sent to trigger the Decode One-Shot 104. Relays NPB (FIGURE 7), P1B (FIGURE 5) and P2B (similar to P1B, but related to #2 Punch) are picked up during this mode of operation, the first one of these three being picked up, as mentioned earlier, because the typewriter must be disabled. The voltage at the base of 139 remains positive because the two resistors $R_2$ and $R_3$ in parallel do not lower the resistance sufficiently relative to $R_1$. With 139 "Off," diode $D_{28}$ is back biased and again blocks path B for the multi-vibrator clock. Also, diode $D_{31}$ is back-biased because of the −15 volts supplied through normally-open but now closed contacts P1B–1 and P2B–1 and diodes $D_{30}$ and $D_{34}$, respectively, and path A is thus blocked. The multivibrator therefore cannot furnish a clock during this mode of operation. Through the now closed P1B–1 and P2B–1 contacts and $R_6$ and $R_7$, respectively, the −15 volts forward-bias diodes $D_{29}$ and $D_{32}$, respectively, allowing the first clock that comes from either #1 Punch Clock 101 or #2 Punch Clock 102 to trigger the Decode One-Shot 104 (clock path C or E). After the One-Shot is triggered, a busy signal provided to the B/R gate 114 by each punch blocks the following clocks until both punches have completed their cycles.

The means for preventing input to Decode O/S 104 while the punches are busy is shown in block form in FIGURE 1, where it is seen that the Busy Ready gate 114 controls triggering of Transfer O/S 115 and the Decode O/S 104. The latter is controlled through another gate 140, shown in circuit form in FIGURE 9. When the Decode O/S 104 is triggered by a negative pulse, the transistor 142 turns on for twenty milliseconds. During this period, if a path (M or alternate in FIGURE 4) exists through the punch strobe amplifier 105 to a punch register 141a (FIGURE 9), the positive pulse from the punch strobe transistor 105 turns off the normally-on transistor 143, removing the clamping voltage which has been blocking the negative pulses from the punch clock. The pulse from the punch clock turns on transistor 144 of the Punch One-Shot 110, which turns off transistor 145, resulting in a transistor solenoid driver (not shown) turning on to execute a punching operation. The output of transistor 144 is differentiated and when the Punch O/S pulse ends, a positive pulse is sent to reset the punch register 141a by turning off transistor 146, which has been putting a positive voltage through diode $D_{38}$ of gate 114 and diode $D_{29}$ of gate 140 to clamp the input to the Decode O/S 104 from the clock selector. The circuits in FIGURE 9 show only one punch register and one Punch One-Shot, both of which are associated with the #2 punch, but identical circuits are available for the #1 punch (or any others) and through diode $D_{40}$ of gate 114, the input to the Decode O/S 104 is clamped as long as either punch has its register "armed." This is also shown in FIGURE 2, where the "#1 Punch On" code sensed in the reader during "Code Control On" mode resulted in both punches being enabled in the third cycle, and, as a consequence, the output of the Busy Ready gate 114 remained high until both punches had completed their punching cycles.

When both punching cycles are complete, the Transfer One-Shot is triggered as previously mentioned) shifting new information into the information register. The output from this one-shot and also that from #1 Delay and #2 Delay clamp the input to the Decode One-Shot (through diodes $D_{41}$, $D_{42}$ and $D_{43}$ in gate 140, as shown in FIGURE 9) so that input from the clock selector 100 is blocked until the system cycle terminates. At that time the next clock pulse can trigger the Decode One-Shot 104 to initiate a new system cycle. The next occurrence of a clock signal on either path C or E again triggers the Decode One-Shot 104, and thus it is clear that the resultant pulse rate is a function of the variable time relation of the two punch clocks.

In FIGURE 9, the Decode One-Shot 104 is a monostable multivibrator circuit in which transistor 141 is normally conducting and transistor 142 is normally non-conducting and capacitor 148 is connected between the collector of transistor 142 and the base of transistor 141. The discharge circuit for capacitor 148 includes resistors 147 and 147a, the latter of which is adjustable to vary the time that transistor 142 remains in its conducting condition once the circuit is triggered. The collector of transistor 142 is connected to the negative power supply terminal through load dropping resistor 153. The output circuit is along lead 149. Diode 154 has been incorporated into the collector circuit of the normally non-conducting transistor 142 to prevent undesired triggering of the multivibrator by fluctuations in the collector voltage supply resulting from variations in the negative supply voltage at the terminal marked minus 15 volts or in the load appearing through lead 149 of the multivibrator output. For the PNP transistors shown, diode 154 is connected with its anode terminal joined to the collector of transistor 142 and to one side of capacitor 148 while the cathode terminal of diode 154 is connected directly to load dropping resistor 153 and also to output lead 149. Thus, when the negative supply voltage or the voltage appearing on output line 149 experiences a positive-going excursion of a magnitude otherwise sufficient to turn on the normally conducting transistor 141, the high back resistance of diode 154 serves as a blocking diode to prevent such voltage fluctuations from being coupled through capacitor 148 to transistor 141 and thereby prevents transient voltages from causing triggering of the multivibrator circuit.

*Typewriter Selected Alone, or With One or Both Punches.* (Clock path B, pulse rate corresponds to 10 characters per second.)

When the typyewriter alone is selected the contacts are in their normal position as shown in FIGURE 8, and transistor 139 is turned on because of the negative voltage at its base from the division of voltage between the −15 volts at normally-closed contact NPB–1 through resistor $R_4$ and $R_1$ to +5 volts. When this transistor is "On," it supplies a ground level to forward-bias diode $D_{28}$ and allow the clock signal from the multivibrator (100 ms. pulse period) to pass to the Decode One-Shot 104 via clock path B. Diode $D_{31}$ is back biased because of the −15 volts supplied through normally-closed contact NPB–1 and diode $D_{34}$, thus blocking path A.

Diodes $D_{29}$ and $D_{32}$ are clamped because of the ground level from "on" transistor 139 supplied through diodes $D_{35}$ and $D_{36}$. This blocks the paths of the punch clock pulses, as previously described.

When one, or both, punches are selected along with the typewriter, transistor 139 is again turned "On" because of negative voltage at its base supplied by −15 volts through normally-closed contact NPB–1, $R_4$, and $R_1$ to +5 v. (Resistors $R_2$ and/or $R_3$ in parallel with $R_4$ only lowers the resistance, increasing drive to transistor 139). There is no change, basically, from the conditions described above and accordingly only clock path B is open.

*No Output Unit Selected* (Clock path A.)

Since the reader 113 does not have a built-in clock, circuits are required to provide a clock even when no output unit is selected. In this mode, relay NPB (FIGURE 7) is actuated, so its normally-closed contact NPB–1 (FIGURE 8) is open and therefore transistor 139 is "Off." With this transistor "Off," the −24 volts from its collector back-biases diode $D_{28}$, and the +5 volts through $R_1$ through its base clamps diodes $D_{29}$ and $D_{32}$ through $R_6$ and $R_7$, but diode $D_{31}$ is not back-biased since neither punch is selected and NPB–1 is now open. Therefore, the pulse from the multivibrator is allowed to pass through diode $D_{31}$ (clock path A).

Having described a general cycle and the Clock Selector there will next be described circuits which provide for obeying, but not punching, command codes when in "Code Control On" mode, and for punching, but not obeying, command codes when in "Code Control Off" mode, using the command to turn on the #1 Punch 106 as an example.

*"Code Control On'" mode*

The "Code Control" logic consists of a relay binary group ATA, ATB and ATC generally indicated at 117 (FIGURE 3), which forms a portion of the Command Register and Controls 118 (FIGURE 1) and which relay binary is set by a transistor switch 119 responsive to a pulse (the initiation of which is described hereinafter) from a decode strobe amplifier 120 passing through a decode tree 121 to register 118. Code Control having been turned on, either manually by a key operated momentary switch, or automatically, the relays ATA, ATB and ATC of the binary 117 (FIGURE 3) will have been pulled in and their various contacts transferred. Also, a reader previously having been selected, the relays of its binary (FIG. 10) will likewise have been pulled in and the contacts transferred. In the figures, all switches operated by these binary relays are shown in the rest condition, i.e. relay not operated and contacts not transferred.

The assumed conditions, then, are (1) "Code Control On"; (2) Reader 113 (FIGURE 1) "on"; (3) a cycle A-A' about to start (see FIGURE 2), assuming #2 Punch 107 has been turned on; and (4) the "#1 Punch On" code is the next information in the reader. These are the basic conditions for the timing diagram of FIGURE 2.

Figure 4:
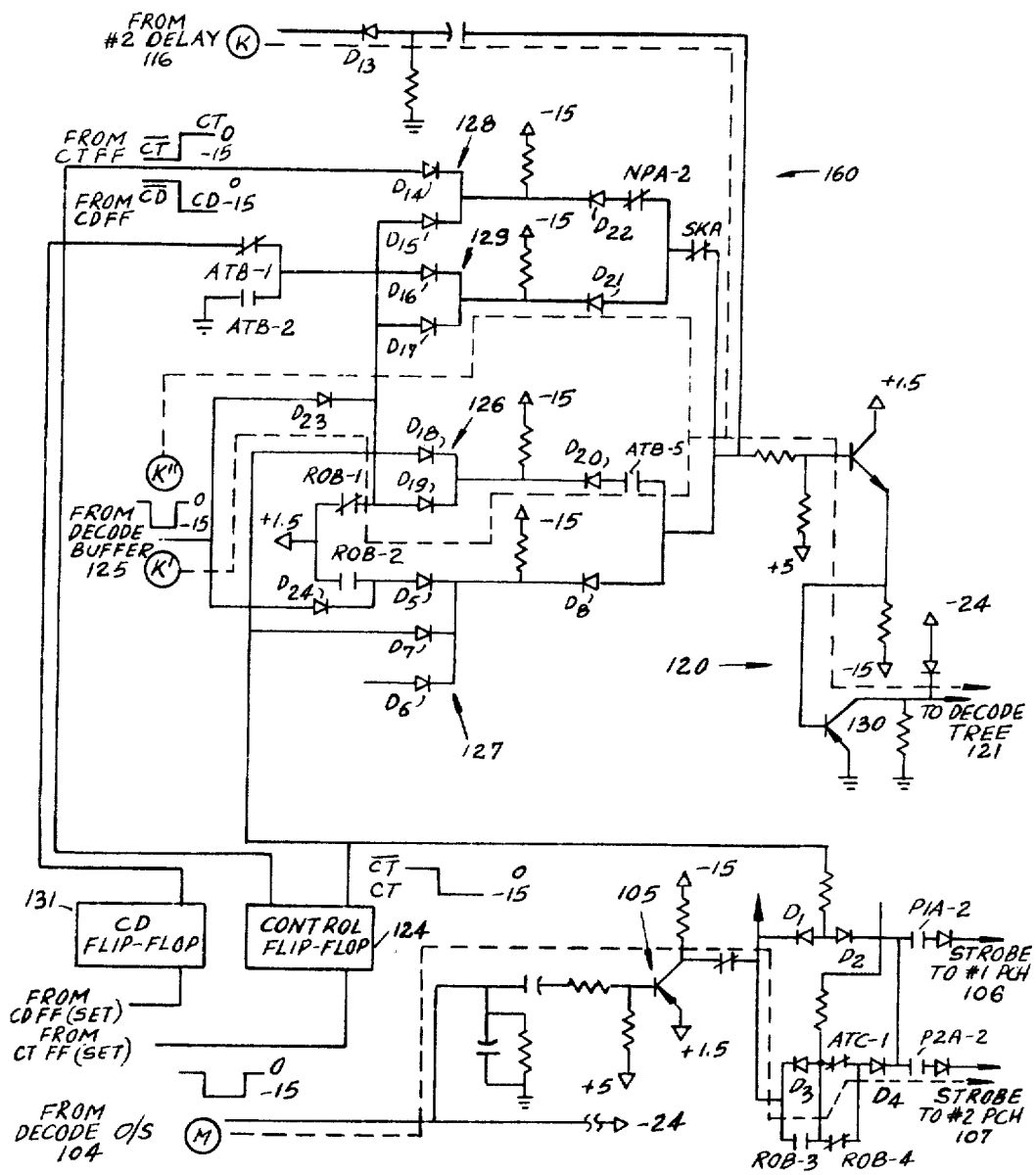

Accordingly, after stepping of the reader (initiated at time A, line 8 in FIGURE 2), the information in the reader is the code for "#1 Punch On." Upon completion of the punch cycle (time D, line 6, in FIGURE 2) for the previous character code there is, as previously described, an output from the Transfer One-Shot 115 (FIGURE 1 and line 9, FIGURE 2) which shifts the "#1 Punch On" code into the information register 111, setting up the decode tree 121 (FIGURE 1). The trailing edge of this pulse from Transfer O/S 115 initiates a pulse through delays #1, #2 and #3 (lines 10, 11 and 12 of FIGURE 2); however, the only output of significance for the present invention is that from #2 delay 116, indicated as occurring at time E+ (line 11). This latter pulse is a short one, and via diode $D_{13}$ at the top of FIGURE 4, turns on the transistor 130 of the decode strobe amplifier 120 (FIGURES 1 and 4) for a short interval at time E+ (line 18, FIGURE 2). The pulse from the decode strobe 120 (FIGURE 1) passing through the path previously established in the decode tree 121 turns on transistor 122 (FIGURE 5) through dotted path G in FIGURE 5. Again, a pulse of correspondingly short duration is generated when transistor 122 is turned on momentarily. The shortness of the pulse sent along dotted path J in FIGURE 5 does not permit pulling in the #1 Punch binary relays 123 (part of the command and control register 118) at this time, but is sufficient via dotted path H (FIGURE 5) to set the control flip-flop 124 CT-FF (FIGURE 4). The CT flip-flop 124 is thus set at time E+ (line 13, FIGURE 2), and is reset at time C' in the second cycle A'-A'' by the trailing edge of the pulse from the Decode One-Shot 104.

When the next clock pulse comes from the clock selector 100 (line 2, time A', FIGURE 2), it triggers the Decode O/S 104 to initiate a long pulse (relative to the length of the pulse from #2 delay 116) from a decode buffer 125. Referring to Decode Logic 160 in FIGURE 4, it will be seen that contact ROB-1 is opened and ROB-2 closed (reader is on and relay RO operated, as previously described). Under these conditions a positive voltage, previously clamping a gate 126 through $D_{19}$, now clamps a gate 127 through $D_5$. There are then three other gates 126, 128, and 129 through which the decode pulse may pass. The uppermost gate 128 is not open, because the CT flip-flop 124, being set, has put a ground-level through diode $D_{14}$ to back-bias diode $D_{15}$ to signals from the decode buffer 125. Similarly, for the next lower gate 129, the contacts ATB-2, now closed, put a ground level through diode $D_{16}$ to back-bias diode $D_{17}$. The CT flip-flop 124 being set, the third gate 126 is open because diode $D_{19}$ is not back-biased via diode $D_{18}$, since the opening of ROB-1 removed the clamp through $D_{19}$.

Accordingly, a path K' exists from the decode buffer through diodes $D_{23}$, $D_{19}$, $D_{20}$, and contacts ATB-5, now closed, such that the long pulse from decode buffer 125 can turn on the decode strobe transistor 130 (FIGURE 4) and strobe the decode tree 121 (FIGURE 1).

This time, however, when the "#1 Punch On" code transistor switch 122 (FIGURE 5) is turned on, the pulse sent through normally-closed contacts CSB and FCB to relays P1A and P1B of #1 punch binary (path J), is of sufficient duration to pull these relays in, and holding circuits are established through contact P1A-1. The #1 Punch is turned on through contact P1A-2 (FIGURE 4) also established when these relays pull in. The holding circuits are subsequently opened in a manner later described in connection with other similar circuits.

The pulse from the Decode O/S 104 attempts to strobe the #2 punch 107, but fails to do so. This follows (see FIGURE 4) because the setting of control flip-flop 124 back-biases diodes $D_1$ and $D_2$, blocking this as a path, while the contacts ATC-1 that are opened in "Code Control On" by energization of relay ATC in FIGURE 3, block the alternate circuit (path M) through diode $D_4$ and the contacts ROB-3, now closed. Thus, the punch strobe pulse not being available to arm the #2 Punch 107 at time A', the #2 Punch cannot be cycled.

The end result is that the command code "#1 Punch On" from the reader 113 has been obeyed as described above, but not punched, all as is required in "Code Control On" mode. Note that the next character read by the reader, if not a command code, will be recorded by both punches (at the clock time for each punch though, see times B'' and C'' in FIGURE 2) because setting the #1 Punch 1 binary turned "on" the #1 Punch during the second cycle, and the #2 Punch had already been turned on.

*"Code Control Off" mode*

The timing diagram for this mode of operation is shown in FIGURE 2A. The pre-conditions are the same as before except that Code Control is "off." The code for "#1 Punch On" is transferred (line 9, FIGURE 2A) into the information register at time D of the first cycle, in exactly the same manner as previously described for "Code Control On" mode. The end of the pulse from the TF One-Shot 115, gives rise to a short pulse from #2 Delay 116 (line 11) at time E+. As described previously this short pulse via diode $D_{13}$ in FIGURE 4 (path K) turns on the decode stroke transistor 130 and strobes a path through the decode tree 121 (FIGURE 1). This path is established by the "#1 Punch On" code in the interval from time D to E (line 9, FIGURE 2A). In FIGURE 5, this path is indicated at G and the short pulse turns on the "#1 Punch On" transistor switch 122 which sets the CT flip-flop 124 at time E+ by sending a pulse over path H, but a pulse sent via path J is not of sufficient duration to pull in the relays of the #1 Punch binary 123.

When the next clock pulse from the clock selector 100 comes at time A', it triggers the Decode O/S 104 (FIGURE 1), giving a long pulse through the decode buffer 125. Referring to FIGURE 4, it will be seen as before, that with ROB-2 closed, there are again only three gates 126, 128 and 129 through which this decode pulse may pass. As before, the uppermost gate 128 is not open because the control flip-flop (CT FF) 124 is set.

In the mode under present consideration, "Code Control Off," the code control binary 117 (FIGURE 3) does not operate relay ATB, so the contacts ATB-1 and ATB-2 are in the condition shown in FIGURE 4. Accordingly, with contact ATB-1 closed, passage of a pulse through diode $D_{17}$ in gate 129 depends upon the condition of the CD flip-flop 131. When not set, this flip-flop 131 puts a ground level through diode $D_{16}$ on the junction of diodes $D_{17}$ and $D_{21}$, thus blocking passage of any of the negative-going signals from the decode buffer 125.

The flip-flop 131 is not set in the present case (conditions for setting it will be described subsequently) and therefore the decode pulse cannot pass through diode $D_{17}$ (gate 129). Since the circuit through diode $D_{19}$, available previously in "Code Control On" mode, is now not completed because the ATB–5 contacts are in their normally-open condition, there is no path available for strobing the decode tree to set the #1 Punch binary. Under these conditions then, there is no decode strobe at time A′, and the command code "#1 Punch On" is not obeyed. (Compare lines 18, FIGURES 2 and 2A.)

The pulse from the Decode O/S 104 (FIGURE 1) was also sent to the punch strobe amplifier 105, but now, in the "Code Control Off" mode, the ATC–1 contacts (FIGURE 4) are in their normally-closed position, and even though diodes $D_1$ and $D_2$ are back-biased because the CT flip-flop 124 is set, a path M is established through the contacts ROB–3 (closed when a reader is on), contact ATC–1, diode $D_4$, and the contacts P2A–2 (closed when #2 Punch is on). Turning on the transistor of the punch strobe amplifier 105 momentarily sends a strobe pulse to arm the #2 Punch at time A′ (line 5, FIGURE 2A) and the trailing edge of the #2 Punch clock (line 1) initiates a cycle in #2 Punch 107 for punching the "#1 Punch On" code from time B′ to D′ (line 6, FIGURE 2A). At completion of this punch cycle, the Transfer O/S 115 (line 9) is triggered, as previously mentioned, to transfer new information into the storage register (recalling that at time A′ the Decode O/S pulse also triggers the Reader Step O/S 112, line 8, to advance the reader tape to a new position). The #2 delay pulse again turns on the decode strobe 120 at time E′+ (line 18, FIGURE 2A) to sense whether or not the new information is a control code. The system is then ready for the next pulse from clock selector 100, to start another cycle at time A″ (line 2, FIGURE 2A).

Thus, it has been shown that in "Code Control Off" mode, the command codes are not obeyed but are punched in the tape of the selected punch (es).

Means for providing the previously noted exception to the rule that command codes are punched but not obeyed in "Code Control Off" mode will be discussed next. This exception arises in the non-compatible system in that the "Code Control On" command code must be both punched and obeyed in the "Code Control Off" mode independently of the Non-Print condition. The timing diagram is shown in FIGURE 2B.

Accordingly, other conditions being the same as in the preceding case—i.e. system in "Code Control Off" mode, the following occurs when a "Code Control On" command code is transferred to the information register. At the end of the pulse from Transfer One-Shot 115 of FIGURE 1 (line 9, time E, FIGURE 2B), which pulse enters this code into register 111 (FIGURE 1), the #2 delay pulse (line 11, time E+, FIGURE 2B) is initiated as in the previous descriptions. This short pulse strobes the decode tree 121 (FIGURE 1) to turn on the "Code Control On" transistor switch 119 (FIGURE 3), sending a pulse to set the CT flip-flop 124 and CD flip-flop 131 (at time E+, lines 13 and 14, FIGURE 2B) along paths O″ and R shown in FIGURES 3 and 6. Note that the contact AOA–5 (boxed in by dashed lines) in path R in the latter figure is not in the circuit presently under discussion, but is added for the compatible system to be described subsequently.

At the next pulse from clock selector 100 (time A′ in FIGURE 2B) the Decode One-Shot 104 (line 3) is triggered. Because the CD flip-flop 131 (line 4) is set in the present case, dotted path K″ in FIGURE 4 is established regardless of whether an alternate path exists through the contact NPA–2 (normally-closed) i.e. the Non-Print condition does not have control. Therefore, the decode pulse passes along dotted path K″ to turn on the decode strobe transistor 130 and strobe the decode tree 121, turning on the transistor switch 119 (FIGURE 3) and pulling in the relays ATA, ATC, and ATB (which comprise the "Code Control On" binary 117) at some time between A′ and C′. The contacts ATC–1 in path M of FIGURE 4 are in normally-closed condition when the Decode One-Shot pulse (line 3, FIGURE 2B) is sent to the punch strobe amplifier 105 (line 4) to arm the #2 punch 107 at time A′ (line 5), because the relay action is slow relative to the arming of the punch. With #2 Punch armed, the trailing edge of the #2 Punch clock (line 1, FIGURE 2B) initiates a punch cycle at time B′ to punch the "Code Control On" code.

Note that the CT flip-flop 124 and CD flip-flop 131 are reset by the trailing edge of the Decode One-shot pulse at time C′ in FIGURE 2B.

From the foregoing, it is seen that in "Code Control Off" mode, the sensing of the "Code Control On" code not only punches the command code, but obeys the command, which is the required exception to the general rule.

Compatible system

Figure 6:
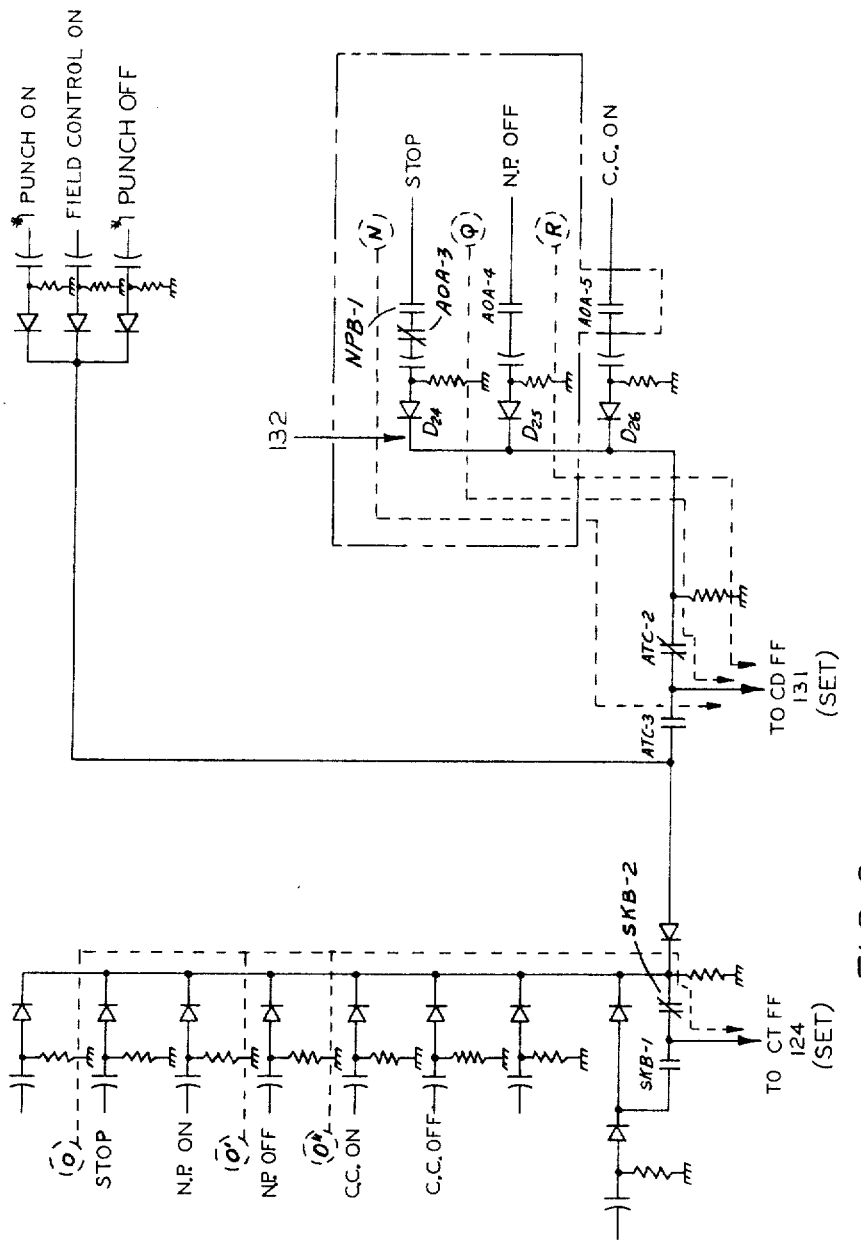
FIGURES 6 and 7 are circuit diagrams of the components which make the present system compatible with systems designed according to prior art.

In order to provide a system having some of the additional flexibility provided by separation of Code Control and Non-Print functions, yet retaining compatibility with systems functioning in the fashion of the prior art, there must be provided means for enabling further exceptions to the rule that command codes are not obeyed in "Code Control Off." These means are shown, for the most part, in the section of FIGURE 6 boxed in by dashed lines. The timing diagram of FIGURE 2B is applicable here also, substituting the appropriate command code where necessary, but the timing points will not be described again here.

The first of these exceptions previously mentioned was that with "Code Control Off" mode having been started manually and the system subsequently put in "Non-Print" condition, sensing of the Stop Code thereafter will turn off "Non-Print," turn on "Code Control," stop the Reader, and punch the Stop Code.

The conditions are that the system is in "Code Control Off" mode and Non-Print condition, the Stop Code is the next code in the reader, and a clock pulse has just been received from clock selector 100. A punch cycle is then started for recording the code previously transmitted to the information register 100. At the end of this punch cycle, the TF One-Shot 115 (FIGURE 1) is triggered to transfer the Stop Code to the information register. As described previously, completion of the TF One-Shot pulse gives rise to a #2 delay pulse for command code sensing.

When the #2 delay pulse strobes the decode tree 121, it momentarily turns on a "Stop Code" transistor switch (not shown, but similar to the "#1 Punch On" code switch 122, FIGURE 5). Then, as shown by path N in FIGURE 6, provided the normally-closed contact AOA–3 has not been opened by actuation of relay AOA, a short pulse passes through the diode $D_{24}$ of OR gate 132 since the normally-open contact NPB–1 has been closed (system in "Non-Print"). Means for actuation of relay AOA will be described later, but suffice it to say that contact AOA–3 is closed when "Code Control Off" mode is entered manually. From OR gate 132 this pulse sets the CD flip-flop 131 (FIGURE 4) if the system is in "Code Control Off" mode, i.e. if contact ATC–2 (FIGURE 6) is in its normally-closed position. Note that the same pulse from the Stop Code transistor switch passes through normally-closed contacts SKB–2 to trigger the CT flip-flop 124 (path O in FIGURE 6).

Reverting to FIGURE 4 it is seen that in "Code Control Off" mode (contact ATB–1 being in the condition shown), setting the CD flip-flop 131 puts a negative level on diode $D_{16}$, thus no longer blocking the path from the decode buffer 125 to the decode strobe transistor 130 through $D_{23}$, $D_{17}$ and $D_{21}$, and normally-closed contacts SKA (path K″). The long pulse from the Decode O/S 104 (line 3, FIGURE 2B), initiated at the next pulse from clock selector 100 (time A'), therefore strobes the decode tree 121 (FIGURE 1) and turns on the Stop Code transistor switch again. From the Stop Code switch, this same long pulse through the normally-closed contact ATB-3 (see path P in FIGURE 7) turns off the "Non-Print Off" transistor 133 (normally-on). The normally supplied ground-level to the holding contact NPA-1 for the relays of the Non-Print binary 134 is then not available. Thus, the holding circuit of these relays is interrupted long enough to allow the relays to drop out. As shown by the continuation of this path (P' in FIGURE 7), this same pulse also passes through another normally-closed contact ATB-4 to set the "Code Control On" binary 117 (relays ATA, ATC and ATB), which is shown in FIGURE 3 by a path also marked P'.

The Decode One-Shot pulse strobes the punch via path M in FIGURE 4 as described previously for "Code Control Off" mode. It will be recalled that the contacts ATC-1 are on a relay, hence the cycle for punching the Stop Code is started before the change to "Code Control On" mode breaks path M.

Lastly, the turning on of the Stop Code transistor switch breaks the holding circuit to the reader binary relays (not shown) long enough for these relays to drop out, thus also turning off the reader, as required. This completes the sequence of actions initiated when the Stop Code is sensed under the stated conditions.

The second exception, previously mentioned, is the automatic turning on of Code-Control when a "Non-Print Off" code is sensed in automatically initiated "Code Control Off" mode. In FIGURE 6, it will be seen that "Non-Print Off" path Q through OR gate 132, requires the contacts AOA-4 to be closed if the sensing of the "Non-Print Off" code is to set the CD flip-flop 131. The means for operating relay AOA to close contacts AOA-4 will therefore be described first. The requirement is that relay AOA be picked up only when "Code Control Off" mode is automatically selected.

The means for achieving this are the parallel sets of normally-open contacts R1C and R2C, shown in FIGURE 3, which are actuated by relays pulled in when either a first reader 113a or a second reader 113b is turned on. They prevent relay AOA from being pulled in unless one or the other reader is on. With a reader on, only codes from the reader tape can be entered into the information register 111, because normally-closed contact RO-1 (FIGURE 1) will now be open. Therefore, when the code transferred to information register 111 at the end of a punch cycle is "Code Control Off," the fact that it is a command code is sensed by the #2 delay pulse, turning on CT flip-flop 124, as previously described. At the next clock selector pulse, the Decode O/S pulse strobes the decode tree 121, turning on the "Code Control Off" code transistor switch 135 (FIGURE 3) and sending a long pulse through either of the now-closed reader contacts R1C or R2C, to pull in the relay AOA. The relay AOA is then held through its contact AOA-1 until a "Code Control Off" code is detected with *neither* of the contacts R1C or R2C closed. The normally-on transistor switch 136 which supplies a ground for the Code Control binary relays and for the relay AOA, is turned off when switch 135 turns on, but if either R1C or R2C is closed, AOA is held in by 135, in the same manner that it was pulled in.

Either reader being "on" when a "Code Control Off" is detected thus signifies that "Code Control Off" was entered automatically.

With the system in the above-described automatically-started "Code Control Off" mode and in Non-Print, sensing a "Non-Print Off" code does the following:

After transfer of the "Non-Print Off" Code to the information register 111, the #2 delay pulse strobes the tree 121 and turns on the "Non-Print Off" transistor switch 137 (see FIGURE 7), thus setting the CT flip-flop 124 and CD flip-flop 131 (paths O' and Q in FIGURE 6), the latter occurring through the now-closed contact AOA-4 (automatically-started "Code Control Off").

At the next clock selector pulse, the Decode One-Shot 104 is triggered and, because the CD flip-flop 131 is set, path K″ in FIGURE 4 is not blocked and a long pulse is available to strobe the decode tree 121 and turn Non-Print "Off" by turning transistor switch 133 off to break the holding circuit for relays NPA and NPB. The same pulse from transistor 137 which turns transistor 133 off (FIGURE 7) pulls in the Code Control relays ATA, ATB and ATC by path P' (FIGURES 3 and 7), as described previously. Also, the Decode One-Shot 104 will send a pulse to strobe the punch through path M (FIGURE 4) and again the relay ATC will not operate fast enough to break path M before the punch has been armed.

In similar fashion, the sensing of a "Code Control On" command during an automatically started "Code Control Off" mode (contact AOA-5 being closed, therefore) sets the CT flip-flop 124 and the CD flip-flop 131 (paths R and O″ in FIGURE 6) at #2 delay time of the previous cycle, thus setting up the conditions which permit strobing the decode tree 121 with a long pulse from the Decode O/S 104 at the next clock selector pulse time to turn on "Code Control." The pulse from Decode O/S 104 also initiates the punch strobe pulse to arm the punch for the cycle which will record the "Code Control On" code in the tape of the selected punch. Again, the punch strobe arms the punch through contacts ATC-1 before these contacts are opened, as occurs when the change to "Code Control On" mode is effected, it will be recalled. Thus, in automatically started "Code Control Off" mode, the sensing of the "Code Control On" code results both in obeying and in punching this command code, which is the required exception to the general rule.

Figure 7:
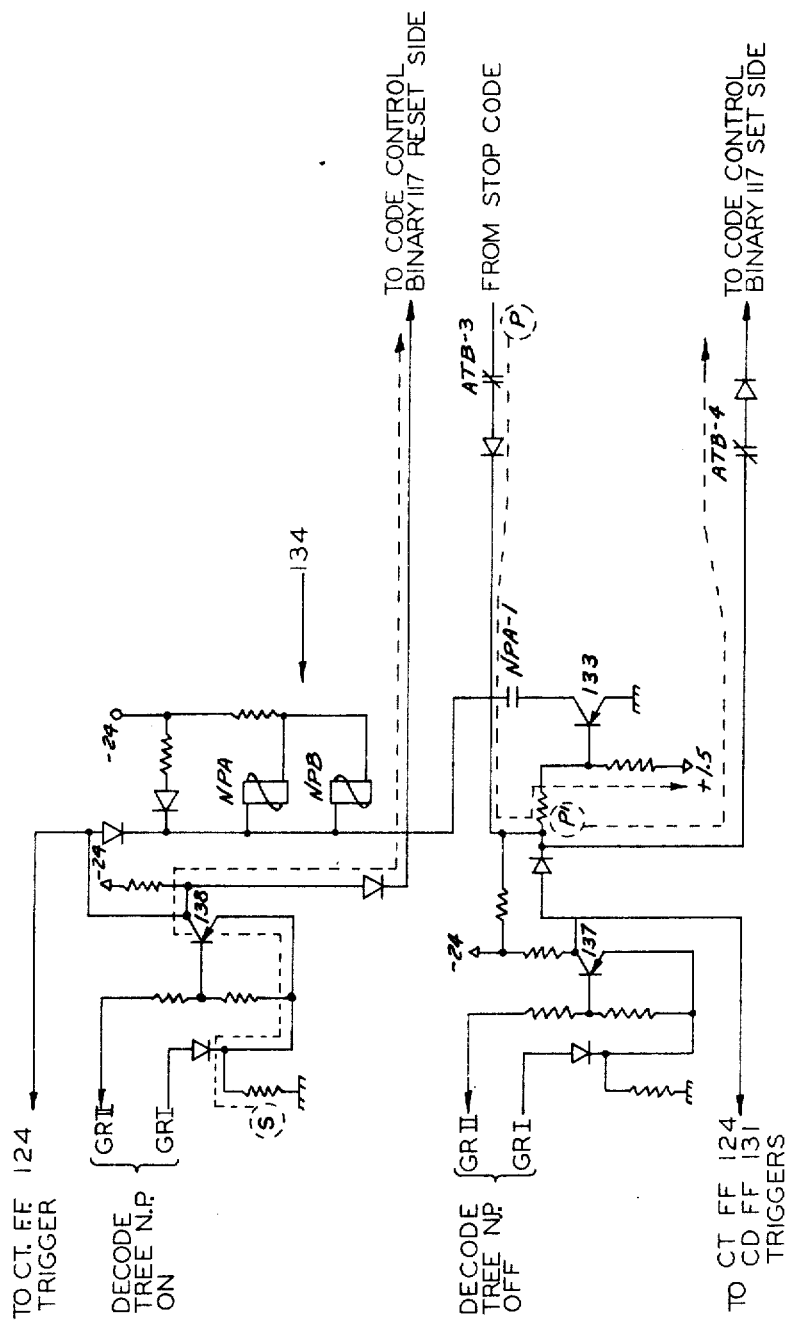

Lastly, though not an exception to a rule, it is of interest to note that, for compatibility, the sensing of the "Non-Print On" code in "Code Control On" mode must turn on Non-Print and also turn off Code Control. In FIGURE 7, it is seen that when the "Non-Print On" code is in the information register 111, the strobe pulse from Decode One-Shot 104 turns on transistor switch 138, to pull in the relays of the Non-Print binary 134. At the same time via path S in FIGURE 7 a pulse is sent to turn off transistor switch 136, normally on, which supplies the holding current for the relays of the Code Control binary 117. The pulse is of sufficient duration to allow the relays to drop out. The path for this pulse is also marked "S" in FIGURE 3.

*Switch reader function*

One of the features of the present invention resides in its ability to turn off the "on" reader and turn on the "off" in response to a code datum in the tape being read by the "on" reader reader. The logic for such arrangement is shown in FIGURE 1 and includes reader switch logic 118a, #1 reader binary register 118b, and #2 reader binary register 118c. The two readers 113a and 113b are capacitated or incapacitated by the output signal from their corresponding reader binary registers 118b and 118c and the circuit is arranged so that only the one capacitated reader is advanced by the output signal from the reader step one-shot 112. Upon detection of a "reader switch" code in decode tree 121, reader switch logic 118a provides an output signal that controls #1 and #2 reader binary registers to transfer their condition. Thus if #1 reader binary register 118b has the #1 reader 113a capacitated and the #2 reader binary register 118c has the #2 reader 113b incapacitated, a signal out of reader switch logic 118a will reverse the states of both binary registers 118b and 118c to thus capacitate the #2 reader 113b and incapacitate the #1 reader.

The next time the reader "switch" command datum is received by decode tree 121, another switch is made to thus capacitate the #1 reader 113a and incapacitate the #2 reader 113b.

In FIGURE 10 a circuit diagram for the reader switch logic 118a and reader binary registers 118b and c is illustrated. The decode tree 121 is shown at the lower left-hand side of the drawing and the output signals to the two readers are shown as being provided by leads near the center of the drawing. The two binary registers 118b and 118c correspond to the identically labeled blocks in FIGURE 1.

Each register 118b and c may comprise a relay control circuit of the type disclosed in copending application Serial No. 73,589, filed December 5, 1960, by Herbert Gilbert and assigned to the assignee of the present invention. These relay binaries may be controlled by a key-operated momentary-contact switch or by a transistor switch as indicated in the Gilbert disclosure.

With reference now to FIGURES 1 and 10, when a decode strobe pulse is sent through decode tree 121 and the register contains the reader "switch" code, a path to the base of transistor 150 therefore having been established, the positive-going pulse will turn "on" the transistor 150, putting a ground voltage at the collector output. Assuming that the #1 Reader 113a is "on" and the #2 Reader 113b is "off," relays R1A, R1B and R1C will be energized. The corresponding relays binary register 118c de-energized as illustrated. The ground potential resulting from the positive voltage effects the following changes in the relay registers 118b and 118c.

Through the now-closed contacts R1B–2, the ground potential is applied to the base of the previously conducting transistor 151 through resistor $R_{11}$ and from there through $R_{12}$ to +1.5 volts. The base of transistor 151 now being at a positive voltage, causes this transistor to turn off, thereby dropping out relay R1A. (The function of transistor 151 in this relay binary is solely to increase the speed of release.) Relays R1B and R1C do not drop out when holding contact R1A–1 returns to its normally-open condition as R1A drops out, because the ground voltage from transistor 150 keeps them energized. They drop out when transistor 150 turns off at the end of the decode strobe pulse when the #1 reader is incapacitated.

The output of switch transistor 150 is also applied to the emitter of transistor 152, normally biased "on," which therefore supplies a ground to energize relay R2A, which is part of the relay binary comprising register 118c. When relays R2A and R2B are energized, normally-open contacts R2A–1 and R2B–2 are closed. The former provides a holding circuit and the latter provides means for releasing relay R2A in a manner identical to that described above for relay R1A. Relays R2B and R2C are not energized at the same time as relay R2A because of the ground voltage from transistor 150 being applied to both terminals of each of these two relays (terminals on one side being supplied through normally-closed contacts R2B–1). When transistor 150 turns off at the end of the decode strobe pulse, these relays are energized through the now closed holding contact R2A–1 to thereby capacitate the #2 reader.

Although the invention has been disclosed as embodied in a data processing mechanism using tape readers, tape punches and a typewriter, it will be obvious to those skilled in the art that various other components may be substituted for those disclosed without departing from the spirit of the invention. For example, a magnetic tape (or a magnetic drum), with a transducing head, or other memory devices may be substituted for the paper tape and reader and still certain of the novel features described herein may be used. Also, other recording devices such as typewriters may be substituted for punches and vice versa. Therefore, in the claims below, the terms "data storing device," "readers" and "information recording devices" do not exclude equivalent devices which may be substituted therefor.

The invention may therefore be embodied in other specific forms without departing from the spirit or essential characteristics thereof. The present embodiment is therefore to be considered in all respects as illustrative and not restrictive, the source of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a data processing mechanism:
 (a) a device for storing alphanumeric and command data;
 (b) a reader for the storage device;
 (c) a tape punch and a typewriter normally responsive to data read by the reader;
 (d) a first command datum preceding a second command datum in the storage device;
 (e) means responsive to the reading of said second command datum by said reader to disable said responsiveness of said typewriter to said data; and
 (f) superseding control means responsive to the reading of said preceding first command datum by said reader for disabling said means responsive to said second command datum, thus retaining said typewriter enabled with respect to said data and subsequently permitting said punch to record said second command datum.

2. In a data processing mechanism:
 (a) a device for storing alphanumeric and command data;
 (b) a reader for the storage device;
 (c) first and second information recording devices, each normally responsive to data read by the reader;
 (d) a first command datum preceding a second command datum in the storage device;
 (e) means responsive to the reading of said second command datum by said reader to disable the responsiveness of said second information recording device to said data; and
 (f) superseding control means responsive to the reading of said first command datum by said reader for disabling said means responsive to said second command datum, thus retaining said second recording device enabled with respect to said data and subsequently permitting said first information recording device to record said second command datum.

3. A data processing mechanism as defined in claim 2 in which said second recording device is a typewriter and the command datum is "non-print."

4. A data processing mechanism having:
 (a) a device for storing alphanumeric and command data;
 (b) a normally-enabled reader for the storing device;
 (c) a normally-enabled tape punch;
 (d) a normally-enabled typewriter;
 (e) means responsive to a selected one of a first group of command data sensed by the reader for selectively disabling the typewriter, the tape punch and the reader;
 (f) means responsive to a selected one of a second group of command data read by the reader for selectively re-enabling the typewriter and the tape punch; and
 (g) control means responsive to a first discrete command datum read by said reader to set said mechanism into a first mode of operation wherein said normally-enabled tape punch records said command data, but said selective disabling means and re-enabling means do not respond to said selected ones of the two groups of command data, with means responsive to a second discrete command datum read by said reader for superseding said first mode of operation with a second mode of operation wherein said normally-enabled tape punch does not record said command data, and said selective disabling means and re-enabling means do respond to said selected ones of the two groups of command data.

5. A data processing mechanism having:
(a) a device for storing coded alphanumeric and command data;
(b) a normally-enabled reader for the device;
(c) a normally-enabled recording device for said coded data;
(d) a normally-enabled non-code recording device including means for decoding said coded data;
(e) means responsive to a selected one of a first group of command data sensed by said reader for selectively disabling the reading and recording devices;
(f) means responsive to a selected one of a second group of command data read by said reader for selectively re-enabling said recording devices; and
(g) control means responsive to a first discrete command datum sensed by said reader to set the mechanism into a first mode of operation wherein said normally-enabled code-recording device records said command data, and said means for disabling said reader and said means for disabling and re-enabling said recording devices do not respond to said selected ones of the two groups of command data, with means responsive to a second discrete command datum sensed by said reader for superseding said first mode of operation by setting said mechanism in a second mode of operation wherein said normally-enabled code-recording device does not record said command data, and said means for disabling said reader and said means for disabling and for re-enabling said recording devices do respond to said selected ones of the two groups of command data.

6. A data processing mechanism having:
(a) a plurality of devices for storing coded alphanumeric and command data, each having a reader associated therewith;
(b) a plurality of information recording devices, at least one being a printing device and at least one being capable of recording information in coded media;
(c) means for selectively enabling or disabling each of said readers and said information recording devices in response to selected ones of said command data read by an enabled one of said readers; and
(d) control means responsive to a first discrete command datum read by said enabled reader to set the mechanism into a first mode of operation wherein an enabled coded-media recording device records said command data, and said means for selectively enabling and disabling the reading and recording devices, including said printing devices, do not respond to said selected ones of said command data; with means responsive to a second discrete command datum read by said enabled reader for superseding said first mode of operation by setting said mechanism in a second mode of operation wherein the enabled coded-media recording device does not record said command data, but said selective enabling and disabling means do respond to said selected ones of said command data.

7. In a data processing mechanism:
(a) two devices for storing alphanumeric and command data;
(b) respective readers for the storage devices, the first one of said readers being enabled and the second one of said readers being disabled;
(c) first and second information recording devices;
(d) means for enabling and disabling each of said information recording devices selectively in response to said command data;
(e) said data processing mechanism being settable in a first mode of operation in which the first recording device is responsive to command data read by the reader and the means for enabling the second recording device is non-responsive to command data read by the reader, and settable in a second mode of operation in which the first recording device is non-responsive to said command data and the second recording device is non-responsive to alphanumeric and command data read by the reader, and the enabling and disabling means for the recording devices are controlled by said enabled reader; and
(f) control means responsive, when said mechanism is in said second mode of operation, to a command datum read by said first reader to disable said first reader and to enable said second reader to control said first recording device.

8. A data processing mechanism as defined in claim 7 in which the first information recording device is a punch and the second information recording device is a typewriter.

9. In a data processing mechanism:
(a) a device for storing alphanumeric and command data;
(b) a normally-enabled reader for the storage device;
(c) a first information recording device, a second information recording device and a third information recording device;
(d) means for enabling and disabling each of said recording devices in response to said command data;
(e) said data processing mechanism being settable in a first mode of operation in which the first recording device is responsive to command data read by the reader and the means for enabling the second and third recording devices are non-responsive to command data read by the reader, and settable in a second mode of operation in which the first recording device is non-responsive to said command data, the third recording device is non-responsive to alphanumeric and command data, and the enabling and disabling means for the recording devices are controlled by said reader; and
(f) control means responsive, when said mechanism is in said second mode of operation, to discrete command data read by said reader to disable said first recording device and to enable said second recording device with respect to command data read by the reader.

10. A data processing mechanism as defined in claim 9 in which the first and second recording devices are punches and the third recording device is a typewriter.

11. In a data processing mechanism:
(a) a device for storing alphanumeric and command data;
(b) a normally-enabled reader for the storage device;
(c) first and second information recording devices;
(d) means for enabling and disabling each of said recording devices selectively in response to said command data;
(e) said data processing mechanism being settable in a first mode of operation in which the first recording device is responsive to command data read by the reader and the means for enabling the second recording device is non-responsive to command data read by the reader, and settable in a second mode of operation in which the first recording device is non-responsive to command data and the second recording device is non-responsive to both alphanumeric and command data, and the enabling and disabling means for the recording devices are controlled by said reader; and
(f) control means responsive, when said mechanism is in said second mode of operation, to a discrete command datum read by said reader to simultaneously disable said first recording device with respect to said reader and to enable continuous operation of the reader.

12. A data processing mechanism as defined in claim 11 in which said first recording device is a punch and the second recording device is a typewriter.

13. A data processing mechanism as defined in claim 11 including control means responsive to a second discrete command datum read by said reader to re-enable said first recording device with respect to said reader.

14. In a data processing mechanism:
   (a) a device for storing alphanumeric and command data;
   (b) a reader for said storing device;
   (c) a first and second information recording device;
   (d) means for enabling and disabling each of said recording devices selectively in response to said command data;
   (e) said data processing mechanism being settable in a first mode of operation in which the first recording device is responsive to command data read by the reader and the second recording device is non-responsive to alphanumeric and command data read by the reader, and settable in a second mode of operation in which the first recording device is non-responsive to said command data, and the enabling and disabling means for the recording devices are controlled by the reader; and
   (f) control means responsive, in said first mode of operation, to command datum read by the reader for simultaneously causing said first recording device to record said datum and to set the data processing mechanism in said second mode of operation.

15. A data processing mechanism as defined in claim 14 in which said first recording device is a punch and said second recording device is a typewriter.

16. A data processing mechanism as defined in claim 14 including means responsive to said command datum read by the reader for enabling the second information recording device to respond to said reader.

17. A data processing mechanism as defined in claim 16, and further having means responsive to said command datum read by said reader for disabling said reader.

18. In a data processing mechanism:
   (a) a device for storing data;
   (b) a reader for said device;
   (c) first and second mechanisms for recording data read by the reader, the first one of which records at a first discrete speed and the second one of which records at a substantially greater speed than the first;
   (d) means for selectively enabling either one of said recording mechanisms to record data read by the reader; and
   (e) means responsive to said selectively enabling means for operating the reader to read data at one of two different speeds corresponding to which recording mechanism is enabled.

19. A data processing mechanism as defined in claim 18 in which the first recording mechanism is a typewriter and the second recording mechanism is a punch.

20. A data processing mechanism having:
   (a) a device for storing data;
   (b) a reader for said device;
   (c) a first synchronously operating punch;
   (d) a second synchronously operating punch;
   (e) a register into which data is read by said reader;
   (f) respective selectively operable means for initiating the operation of said first and second punches to punch data under the control of said register; and
   (g) a respective mechanism operable by each punch upon completion of punching each datum for operating said respective initiating means.

21. A data processing mechanism as defined in claim 20 including a free running signal generator operable to supply initiating signals to said initiating means, and means to block said signals until the punch completes the punching of said datum.

22. A data processing mechanism as defined in claim 20 including means responsive to completion of the punching of said datum by both said punches for causing said reader to read the next datum into the information register.

23. A data processing mechanism as defined in claim 22 including means for delaying the operation of the punch initiating means until after said next datum has been read into the information register.

24. A data processing mechanism as defined in claim 14, wherein said means for setting said data processing mechanism in said first mode of operation is responsive to a command datum for disabling said second recording device.

25. A data processing mechanism having:
   (a) a device for storing alphanumeric and command data;
   (b) a normally-enabled reader for the storing device;
   (c) a normally-enabled tape punch;
   (d) a normally-enabled typewriter;
   (e) means responsive to a selected one of a first group of command data sensed by the reader for selectively disabling the typewriter, the tape punch and the reader;
   (f) means responsive to a selected one of a second group of command data read by the reader for selectively re-enabling the typewriter and the tape punch; and
   (g) control means responsive to a first manual operation to set said mechanism into a first mode of operation wherein said normally-enabled tape punch records said command data, but said selective disabling means and re-enabling means do not respond to said selected ones of the two groups of command data, with means responsive to a second manual operation for superseding said first mode of operation with a second mode of operation wherein said normally-enabled tape punch does not record said command data, and said selective disabling means and re-enabling means do respond to said selected ones of the two groups of command data.

26. A data processing mechanism having:
   (a) a device for storing coded alphanumeric and command data;
   (b) a normally-enabled reader for the device;
   (c) a normally-enabled recording device for said coded data;
   (d) a normally-enabled non-code recording device including means for decoding said coded data;
   (e) means responsive to a selected one of a first group of command data sensed by said reader for selectively disabling the reading and recording devices;
   (f) means responsive to a selected one of a second group of command data read by said reader for selectively re-enabling said recording devices; and
   (g) control means responsive to a first manual operation to set the mechanism into a first mode of operation wherein said normally-enabled code-recording device records said command data, and said means for disabling said reader and said means for disabling and re-enabling said recording devices do not respond to said selected ones of the two groups of command data, with means responsive to a second manual operation for superseding said first mode of operation by setting said mechanism in a second mode of operation wherein said normally-enabled code-recording device does not record said command data, and said means for disabling said reader and said means for disabling and for re-enabling said recording devices do respond to said selected ones of the two groups of command data.

27. A data processing mechanism having:
   (a) a plurality of devices for storing coded alphanumeric and command data, each having a reader associated therewith;
   (b) a plurality of information recording devices, at least one being a printing device and at least one being capable of recording information on coded media;

(c) means for selectively enabling or disabling each of said readers and said information recording devices in response to selected ones of said command data read by an enabled one of said readers; and (d) control means responsive to a first manual operation to set the mechanism into a first mode of operation wherein an enabled coded-media recording device records said command data, and said means for selectively enabling and disabling the reading and recording devices, including said printing devices, do not respond to said selected ones of said command data; with means responsive to a second manual operation for superseding said first mode of operation by setting said mechanism in a second mode of operation wherein the enabled coded-media recording device does not record said command data, but said selective enabling and disabling means do respond to said selected ones of said command data.

References Cited by the Examiner

UNITED STATES PATENTS

| 2,641,717 | 6/1953 | Toth | 307—88.5 |
| 2,644,894 | 7/1953 | Lo et al. | 307—88.5 |
| 2,918,658 | 12/1959 | Hoberg et al. | 235—61.9 X |
| 2,991,453 | 4/1961 | Leonard | 235—61.7 X |

FOREIGN PATENTS 749,836   6/1956   Great Britain.

ROBERT C. BAILEY, *Primary Examiner.*

ROBERT PULFREY, *Examiner.*

F. A. LUKASIK, P. L. BERGER, *Assistant Examiners.*